United States Patent
Fan

(10) Patent No.: US 7,037,414 B2
(45) Date of Patent: May 2, 2006

(54) PHOTOELECTROLYSIS OF WATER USING PROTON EXCHANGE MEMBRANES

(75) Inventor: Qinbai Fan, Chicago, IL (US)

(73) Assignee: Gas Technology Institute, Des Plaines, IL (US)

( * ) Notice: Subject to any disclaimer, the term of this patent is extended or adjusted under 35 U.S.C. 154(b) by 237 days.

(21) Appl. No.: 10/617,466

(22) Filed: Jul. 11, 2003

(65) Prior Publication Data

US 2005/0005963 A1    Jan. 13, 2005

(51) Int. Cl.
*C25B 1/04* (2006.01)
*C25B 9/10* (2006.01)

(52) U.S. Cl. ............... 204/242; 204/246; 204/247; 204/252; 204/266; 205/340; 205/334; 205/633; 205/637

(58) Field of Classification Search ............... 204/242, 204/290.11; 429/111, 309; 205/340
See application file for complete search history.

(56) References Cited

U.S. PATENT DOCUMENTS

| 4,181,593 A | 1/1980 | McKinzie et al. |
| 4,215,155 A | 7/1980 | McKinzie et al. |
| 4,400,451 A * | 8/1983 | Gordon ............... 429/111 |
| 6,409,893 B1 * | 6/2002 | Holzbock et al. .......... 204/242 |
| 2002/0127474 A1 * | 9/2002 | Fleischer et al. ......... 429/309 |

* cited by examiner

*Primary Examiner*—Roy King
*Assistant Examiner*—Lois Zheng
(74) *Attorney, Agent, or Firm*—Mark E. Fejer

(57) ABSTRACT

A photoelectrochemical cell which includes a light transmissive enclosure, a semiconductor photoanode disposed within the light transmissive enclosure, a semiconductor photocathode disposed within the light transmissive enclosure, and an electrolytic solution disposed entirely between the semiconductor photoanode and the semiconductor photocathode. This is achieved by the use of semiconductor photoelectrodes (photoanodes and photocathodes) which include a proton exchange membrane having an electrolyte facing surface in contact with the electrolytic solution and a light transmissive wall facing surface, and having a photo electro-catalyst disposed on the light transmissive wall facing surface.

26 Claims, 4 Drawing Sheets

PHOTOELECTROLYSIS OF WATER USING PROTON EXCHANGE MEMBRANES

BACKGROUND OF THE INVENTION

1. Field of the Invention

This invention relates to a method and apparatus for producing hydrogen and oxygen from water using photoelectrolysis. More particularly, this invention relates to a method and apparatus for photoelectrolysis of water to produce hydrogen and oxygen using sunlight illumination.

2. Description of Related Art

Photoelectrochemistry is the study of the interaction of light (in particular, radiation in the "sunlight" region, about 87 to 308 kJ/mole or about 0.9 to about 3.2 eV per photon) with electronic flow and chemical reactions at the electrode surfaces in electrochemical cells. The radiation involved in this process has considerable energy and can be used for the direct production of electricity and the splitting of water into hydrogen and oxygen, referred to as photoelectrolysis. However, to be practical, efficient and inexpensive systems utilizing readily available materials must be devised for the conversion process. The hindrances to practical applications of the system include the poor stability and low efficiency of the photoelectrode due to photoelectrochemical reactions involving photon-electron transfer and recombination, redox exchange and surface corrosion. For photoelectrolysis to be competitive with conventional fuel sources, it is necessary that these problems be addressed.

Present day photoelectrolysis systems employ a fairly thick electrolyte that limits the transmission of sunlight to and the departure of product gases from the photoelectrodes due to electrolyte surface tension. The current design of photo electrodes is an additional hindrance to the development of improved photoelectrochemical systems because the semiconductors employed therein are fabricated on conductive substrates. With this type of design, there is no way to reduce the thickness of the electrolyte layer and eliminate the surface tension that acts as an inhibitor to the release of product gases because the reactant water and electrolyte must be transported to the front of the electrode.

Numerous efforts have been made to enhance the efficiency and stability of photoelectrochemical cells. The general approach has been to coat a layer of protective materials, which may be organic substances, active metal ions, noble metals, light sensitive dyes and more stable semiconductors, such as metal oxides, onto the photoelectrode surface. Recent developments include a thin film dye to sensitize the semiconductor electrodes in photoelectrochemical cells. Although the use of light sensitive dyes on the semiconductor electrode surface has improved the light absorption efficiency thereof, it is still necessary that the mass transport rate be increased and that the electrolyte thickness be reduced.

SUMMARY OF THE INVENTION

Accordingly, it is one object of this invention to provide a photoelectrolysis cell having improved efficiency and performance stability over convention photoelectrolysis cells.

It is another object of this invention to provide a photoelectrolysis cell which enables the transmission of sunlight to the photoelectrode catalyst surface without incurring the energy losses incurred in conventional photoelectrolysis cells.

It is yet a further object of this invention to provide a photoelectrolysis cell suitable for splitting water into hydrogen and oxygen, which eliminates the water surface tension responsible for hindering the escape of the hydrogen and oxygen gases from the catalyst surface encountered in conventional photoelectrolysis cells.

These and other objects of this invention are addressed by a photoelectrochemical cell comprising a light transmissive enclosure, a semiconductor photoanode and a semiconductor photocathode disposed within the light transmissive enclosure, and an electrolytic solution disposed entirely between the semiconductor photoanode and the semiconductor photocathode. Because the electrolytic solution employed in the photoelectrochemical cell is limited to a volume disposed between the photoanode and the photocathode (collectively referred to herein as "photoelectrodes"), the sunlight is able to directly shine on the catalyst surfaces of the photoelectrodes to produce hydrogen and oxygen. Thus, this invention eliminates the solar energy losses due to water (electrolyte) sorption; and because there is no thick water (electrolyte) layer between the sunlight and the catalyst surfaces as in conventional photoelectrochemical cells, the product gases, hydrogen and/or oxygen, are able to leave the catalyst surface easily without any restriction imposed by water surface tension. That is, the three-phase (gas, solid catalyst and liquid electrolyte) area is optimized to increase the solar energy efficiency.

This is accomplished by employment of a photoelectrode assembly in which the photo electro-catalysts are deposited onto a proton exchange membrane, such as NAFION®, a perfluorosulfonic acid polymer available from DuPont. In this application, the proton exchange membrane performs a multitude of functions including gas separation, water containment, proton exchanger and water transporter. The ionomer of the proton exchange membrane in the catalyst layer acts as a capillary channel to transport water to the catalyst surface and as an electron conductor to transport electrons between the two photoelectrodes. In addition, this fully hydrophilic ionomer helps to distribute water to the catalyst surface without blocking the incoming solar energy.

BRIEF DESCRIPTION OF THE DRAWINGS

These and other objects and features of this invention will be better understood from the following detailed description taken in conjunction with the drawings wherein.

DETAILED DESCRIPTION OF THE PRESENTLY PREFERRED EMBODIMENTS

Figure 1:
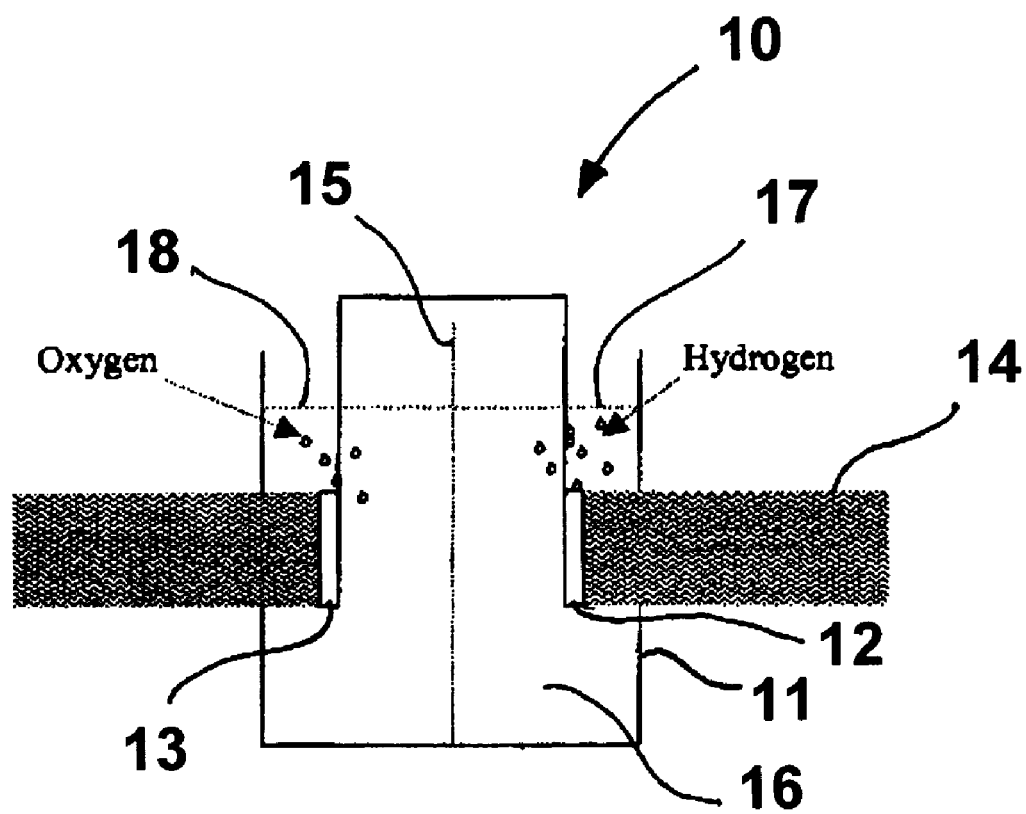
FIG. 1 is a schematic diagram of a conventional photoelectrolysis cell for water splitting.

In a conventional photoelectrolysis cell, also referred to herein as a photoelectrochemical cell, there is a thick layer of electrolyte, typically water, between the sunlight entering the cell and the photoelectrode through which the sunlight must pass to get to the photoelectrodes. To increase the catalyst efficiency and the solar energy efficiency, the electrolyte thickness in the photoelectrochemical cell must be reduced to as thin as possible so as to reduce the solar energy absorption by the electrolyte. FIG. 1 is a diagram showing a conventional water-splitting photoelectrochemical cell 10, which cell comprises a transparent housing or enclosure 11 filled with an electrolyte (water) 16, a semiconductor photoanode 13 and a semiconductor photocathode 12 disposed within and surrounded by the electrolyte and a separator 15 also disposed within the electrolyte separating the semiconductor photoanode 13 from the semiconductor photocathode 12. The hydrogen half-cell reaction for this cell is:

$$2H^+(aq) + 2e^- \rightarrow H_2(g) \quad 0 \text{ V vs. NHE}$$

and the oxygen half-cell reaction is:

$$2H_2O(l) + 4h^+ \rightarrow 4H^+(aq) + O_2(g) \quad 1.23 \text{ V vs. NHE}$$

Thus, the total reaction is:

$$2H_2O \rightarrow 2H_2(g) + O_2(g)$$

Therefore, in the whole reaction, there is no loss of a proton.

As can be seen in FIG. 1, conventional photoelectrolysis cells have a thick layer 17, 18 of liquid water between the transparent enclosure 11 and the photoelectrode 12, 13, through which the sunlight 14 must pass to get to the photoelectrodes. This layer thickness is very difficult to reduce. As a result, a substantial amount of solar energy is lost as the sunlight passes through the liquid water to the photoelectrode.

Figure 2:
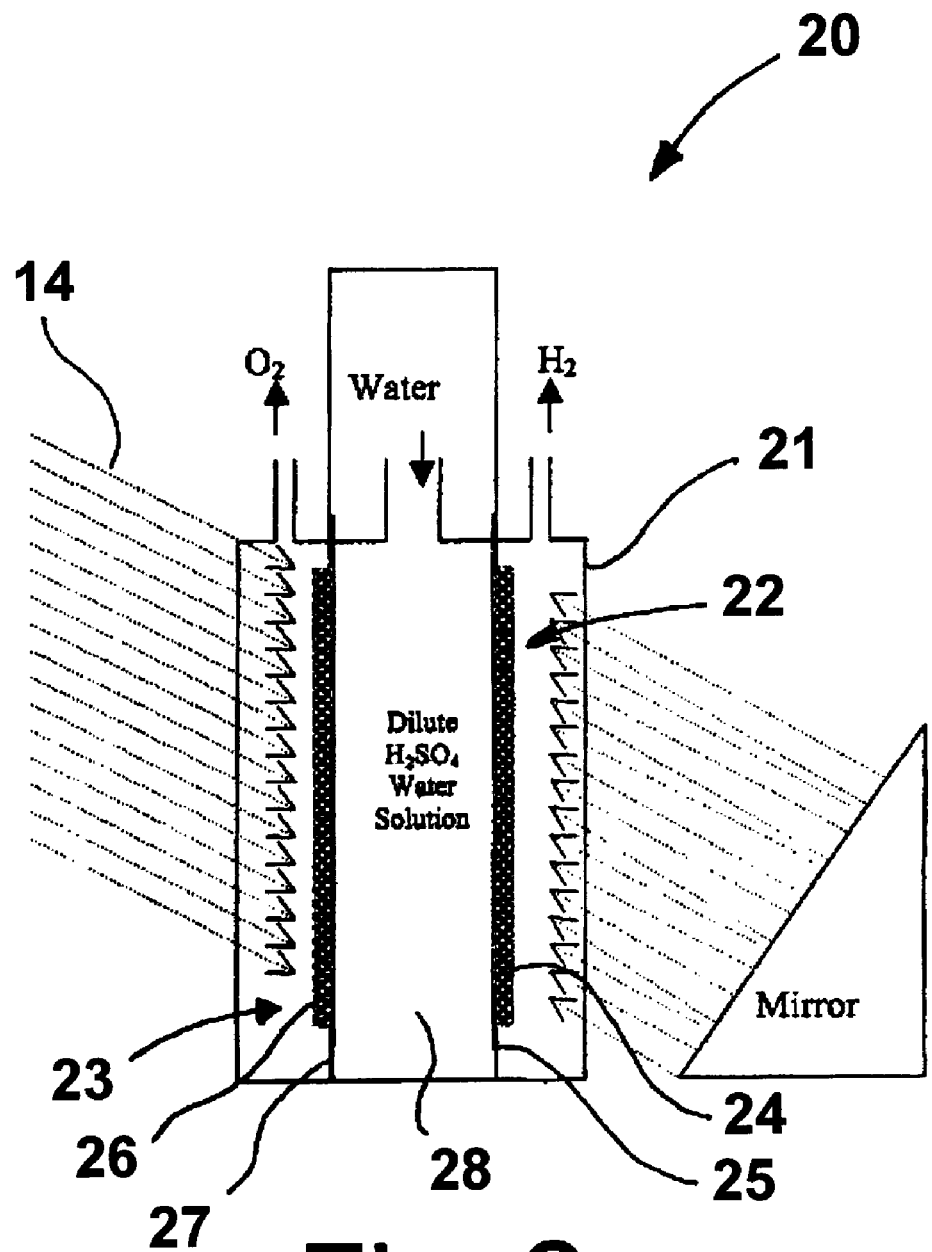
FIG. 2 is a schematic diagram of a water-splitting photoelectrolysis reactor or cell in accordance with one embodiment of this invention.

FIG. 2 shows a photoelectrolysis cell 20 in accordance with one embodiment of this invention, which cell comprises a transparent enclosure 21, preferably constructed of glass or PLEXIGLAS® (a transparent acrylic material), a photoanode 23, a photocathode 22 and an electrolyte 28 in the form of a dilute $H_2SO_4$ water solution disposed there between. Photocathode 22 comprises a proton exchange membrane 25 in contact with the electrolyte 28 and a semiconductor catalytic layer 24 disposed on the surface of proton exchange membrane 25 facing away from electrolyte 28 and in the direction of transparent enclosure 21. Similarly, photoanode 23 comprises a proton exchange membrane 27 in contact with electrolyte 28 and a semiconductor catalytic layer 26 disposed on the surface of proton exchange membrane 27 facing away from electrolyte 28 and in the direction of transparent enclosure 21. As will be appreciated from consideration of the invention as shown in FIG. 2, there is no electrolyte disposed in the space between photoanode 23, photocathode 22 and transparent enclosure 21. As a result, the only solar energy loss encountered by the sunlight 14 as it shines on the photoelectrodes is due to the transparent enclosure wall of transparent enclosure 21. In operation, the electrolyte water is distributed from the side of the semiconductor catalytic layers 24, 26 facing the electrolyte 28 (the backside of the semiconductor catalytic layers) and transported to the catalyst layer by an ionomer coated on the catalyst surface. The products from the photoelectrolysis, hydrogen and oxygen, can, thus, leave the surfaces of the photoelectrodes without any restrictions from liquid water. Proton transfer from the photocathode to the photoanode is effected by the proton exchange membranes 25, 27. Thus, the proton exchange membrane 25, 27 functions as a gas separator, water container, proton exchanger, and water transporter.

To be suitable for use as a water-splitting photoelectrode, the semiconductor employed must have the appropriate band gap, electronic energies and chemical stability. Wide band gap semiconductors, such as $TiO_2$, have the appropriate band edge energies for water splitting and have good photoelectrochemical stability. Under illumination, the absorption of light by a semiconductor results in the promotion of an electron from a lower occupied energy band (the valence band) into a higher unoccupied energy level (the conduction band). The valence band forms a hole after the electron leaves. The electron-hole pair can recombine after it reacts with the electrolyte, resulting in the conversion of the light energy to chemical energy.

The semiconductor material utilized in the apparatus of this invention may be $TiO_2$ with a different doping to be n- or p-type. In accordance with one preferred embodiment of this invention, the semiconductor material is mixed with 20% by weight NAFION and 10% by weight carbon black to form a slurry. This slurry is applied to a NAFION proton exchange membrane by one of several coating techniques. The key requirement is that a three-phase contact area is formed in the photoelectrolysis cell. On the photosensitive semiconductor surface, the reactant, i.e. liquid water is needed and the product gas is hydrogen. If the liquid water layer is too thick, as is the case with conventional systems, it is more difficult for the hydrogen gas to leave the catalyst surface. A good three-phase area provides easy transport of the liquid water to the catalyst surface and easy departing of the product gas from the catalyst surface. It is also important that the water layer be as thin as possible to reduce the absorption of the light.

Figure 3:
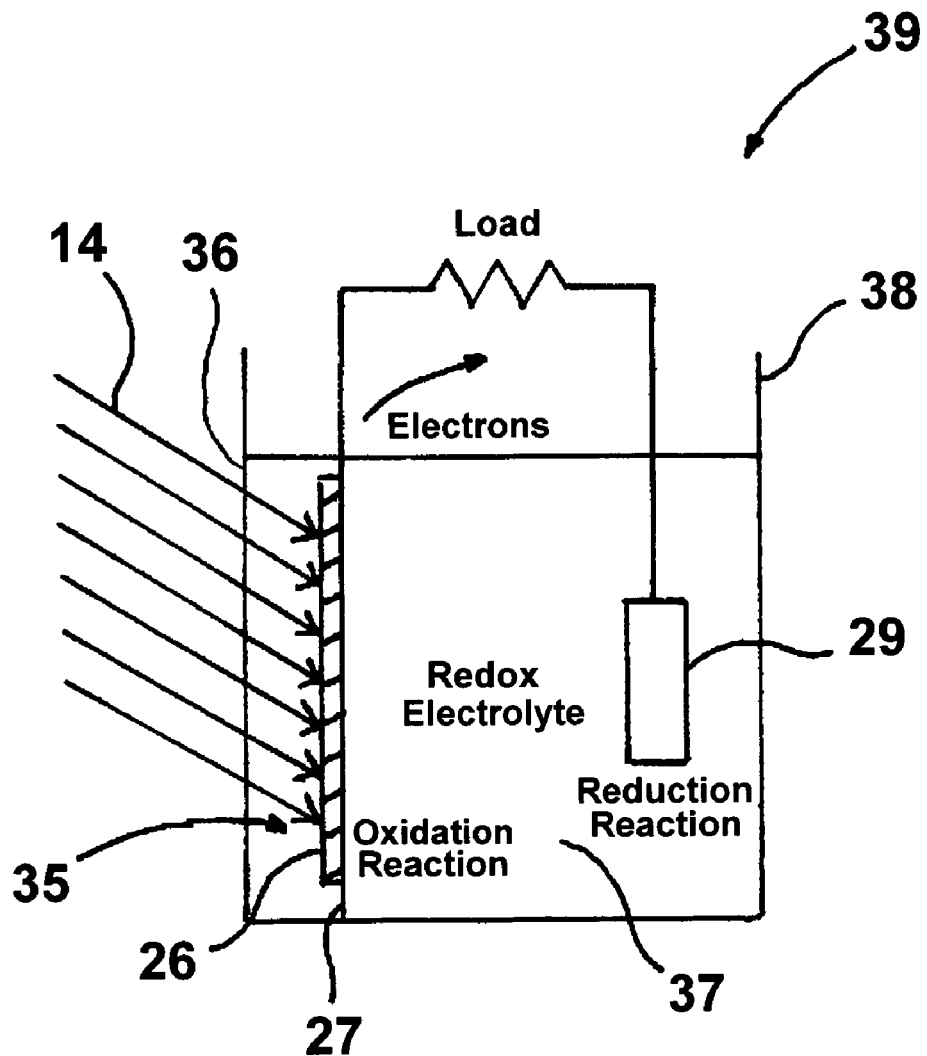
FIG. 3 is a schematic diagram of a photoelectrochemical photovoltaic cell for generating electricity using a photoelectrode in accordance with one embodiment of this invention.

Although particularly suitable for use in connection with water-splitting to produce hydrogen and oxygen, the photoelectrode of this invention is also suitable for use in connection with photovoltaic applications for the generation of electricity. FIG. 3 shows a photoelectrochemical photovoltaic cell 39 in accordance with one embodiment of this invention, which cell comprises a housing 38 having a transparent wall 36 through which sunlight 14 is able to pass into the cell. Disposed within housing 38 is at least one semiconductor photoelectrode 35 comprising proton exchange membrane 27 having one side facing, and in contact with, a redox electrolyte 37 contained within housing 38 and comprising a semiconductor catalytic layer 26 disposed on, and in contact with, the opposite side of proton exchange membrane 27. Semiconductor photoelectrode 35 is oriented within housing 38 such that sunlight 14 passing through transparent wall 36 strikes semiconductor catalytic layer 26. In addition, proton exchange membrane 27 acts as a barrier, which prevents the redox electrolyte 37 from flowing into the space between transparent wall 36 and semiconductor photoelectrode 35, as a result of which the only substantial solar energy loss occurs in the passage of the sunlight through transparent wall 36. Disposed within redox electrolyte 37 is a second electrode 29, which is not a photoelectrode, but rather is a conventional electrode, which is not exposed to the sunlight, or at least is not energized in the presence of sunlight. In the embodiment shown in FIG. 3, the oxidation reaction occurs at semiconductor photoelectrode 35 and the reduction reaction occurs at the second electrode 29, resulting in the flow of electrons.

Figure 4:
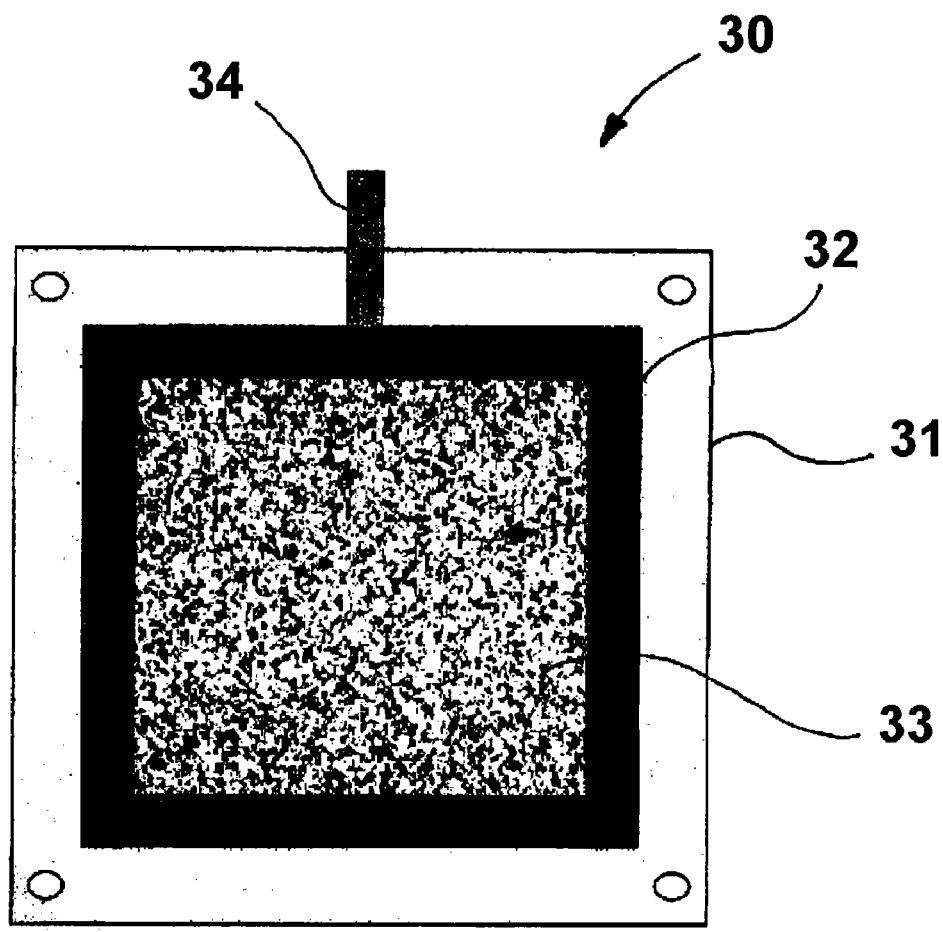
FIG. 4 is a schematic plan view of a photoelectrode assembly in accordance with one embodiment of this invention.

FIG. 4 is a diagram of a photoelectrode assembly 30 suitable for use in the system of this invention. The photoelectrode assembly comprises photoelectrode 33, proton exchange membrane 31, a carbon electrode 32 for transfer of current and a metal strip 34 for connecting the photoelectrode assembly to another photoelectrode.

Such a photoelectrode in accordance with one embodiment of this invention is fabricated with semiconductor powders, carbon black powders and a NAFION emulsion as a binder and a transporter of water and protons. The carbon black is used to make the semiconductor layer electrically conductive. In accordance with one alternative embodiment of this invention, an electrically conductive polymer, such as polyaniline or polypyrrole can be used in place of carbon black. To provide proton conductivity, the polymer may also be sulfonated. Accordingly, a suitable semiconductor catalyst layer can also be fabricated by mixing semiconductor powders and the aforementioned electron conductive and proton conductive polymers.

EXAMPLE 1

A photoelectrode in accordance with one embodiment of this invention is produced by dissolving hydrogen hexachloroplatinate (IV) (Aldrich) in water as a 100 ml 1% (W/W) solution. 0.2 g of $TiO_2$ (Rutile) (Aldrich) is mixed into the solution [$Pt:TiO_2$ (mole ratio)=1:1]. The solution is titrated with 1% $NaBH_4$ (0.1 g $NaBH_4$) (Aldrich). 0.1 g XC 72R carbon black, available from Cabot Corporation, Alpharetta, Ga., is added to the solution, which is then stirred well. The resulting suspension is filtered and washed until there are no chloride ions in the powder. The powder is then dried at 450° C. for about 2 hours. The dried powder is then ground and mixed with isopropanol and water with 20% NAFION (DuPont) thereby forming an ink. The ink is applied to a NAFION proton exchange membrane by any suitable coating technique, resulting in the formation of a photoanode. In a similar fashion, a photocathode can be produced using a p-type semiconductor instead of $n\text{-}TiO_2$.

EXAMPLE 2

In this example, rutile type $TiO_2$ is treated with $TiCl_4$ solution. The $TiCl_4$-modified $TiO_2$ is sintered at 450° C. to produce a Ti-rich $TiO_2$ (n-type) semiconductor powder. The powder is then mixed with isopropanol, 10% by weight XC-72R carbon black, and 20% by weight NAFION emulsion to form an ink solution. The ink is applied to the NAFION membrane by the decal method or other suitable coating techniques, resulting in formation of a photoanode. The photocathode is made from sintering $TiO_2$ in a sulfur vapor environment at 450° C. The $TiO_2$ powder is mixed with 1% by weight sulfur powder, which mixture is then sintered for about two hours at 450° C. The sintered mixture is then ground to mix with carbon black and NAFION as previously described.

EXAMPLE 3

In this example, a photoelectrode is produced as before with the exception that the 10%. by weight carbon black and 20% by weight NAFION are replaced by sulfonated polyaniline, i.e. Polyaniline-campphorsulfonic acid (PANI-$CSA_{0.5}$). Polyaniline powder is mixed with campphorsulfonic acid to form PANI-$CSA_{0.5}$, which is then dissolved in m-cresol. The resulting solution is then added to the $TiO_2$ powder to form an ink comprising 70% by weight semiconductor catalyst and 30% by weight PANI-$CSA_{0.5}$.

EXAMPLE 4

In this example, to increase light absorption by the photosensitive semiconductor catalyst, a dye is applied. Suitable photosensitizers include porphyrins. For example, zinc tetra phenylporphyrin can be dissolved in isopropanol with water and then mixed with the ink described in Examples 1 and 2. In this manner, the dye is embedded within the semiconductor powder.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

I claim:

1. In a photoelectrochemical cell having at least one semiconductor photoelectrode, a second electrode and an electrolytic solution disposed there between, the improvement comprising:
    a housing enclosing said photoelectrochemical cell, said housing comprising at least one light transmissive wall, said light transmissive wall and said at least one semiconductor photoelectrode forming a space there between, said space containing substantially no said electrolytic solution;
    said at least one semiconductor photoelectrode comprising a proton exchange membrane having an electrolyte facing surface in contact with said electrolytic solution and a light transmissive wall facing surface; and
    a photo electro-catalyst disposed on said light transmissive wall facing surface.

2. A photoelectrochemical cell in accordance with claim 1, wherein said second electrode is a semiconductor photoelectrode.

3. A photoelectrochemical cell in accordance with claim 2, wherein each of said semiconductor photoelectrodes comprises at least one wide band gap semiconductor.

4. A photoelectrochemical cell in accordance with claim 3, wherein said at least one wide band gap semiconductor is a p-type semiconductor comprising $TiO_2$.

5. A photoelectrochemical cell in accordance with claim 3, wherein said at least one wide band gap semiconductor is an n-type semiconductor comprising $TiO_2$.

6. A photoelectrochemical cell in accordance with claim 3, wherein said at least one wide band gap semiconductor comprises carbon black.

7. A photoelectrochemical cell in accordance with claim 6, wherein said at least one wide band gap semiconductor comprises a perfluorosulfonic acid polymer emulsion binder.

8. A photoelectrochemical cell in accordance with claim 3, wherein said at least one wide band gap semiconductor comprises at least one electrically conductive polymer.

9. A photoelectrochemical cell in accordance with claim 8, wherein said at least one electrically conductive polymer is selected from the group consisting of polyaniline, polypyrrole and combinations thereof.

10. A photoelectrochemical cell in accordance with claim 8, wherein said at least one electrically conductive polymer is at least partially sulfonated.

11. A photoelectrochemical cell in accordance with claim 3, wherein said at least one wide band gap semiconductor comprises one of an electron conductive polymer and a proton conductive polymer.

12. A photoelectrochemical cell in accordance with claim 1, wherein said light transmissive wall is made of a material selected from the group consisting of glass and a transparent, acrylic material.

13. A photoelectrochemical cell in accordance with claim 1 further comprising a metallic connector suitable for connecting said photoelectrochemical cell to another photoelectrochemical cell.

14. A photoelectrochemical cell comprising:
a light transmissive enclosure;
a semiconductor photoanode disposed within said light transmissive enclosure;
a semiconductor photocathode disposed within said light transmissive enclosure;
at least one of said semiconductor photoanode and said semiconductor photocathode disposed at a distance from a wall of said light transmissive enclosure, forming a space between said at least one of said semiconductor photoanode and said semiconductor photocathode and said wall; and
an electrolytic solution disposed entirely between said semiconductor photoanode and said semiconductor photocathode.

15. A photoelectrochemical cell in accordance with claim 14, wherein each of said semiconductor photoanode and said semiconductor photocathode comprises a proton exchange membrane having an electrolytic solution facing surface in contact with said electrolytic solution and a light transmissive enclosure facing surface, and a semiconductor layer disposed on said light transmissive enclosure facing surface.

16. A photoelectrochemical cell in accordance with claim 15, wherein said semiconductor layer comprises at least one wide band gap semiconductor.

17. A photoelectrochemical cell in accordance with claim 16, wherein said at least one wide band gap semiconductor is a p-type semiconductor.

18. A photoelectrochemical cell in accordance with claim 16, wherein said at least one wide band gap semiconductor is an n-type semiconductor.

19. A photoelectrochemical cell in accordance with claim 16, wherein said at least one wide band gap semiconductor comprises carbon black.

20. A photoelectrochemical cell in accordance with claim 19, wherein said at least one wide band gap semiconductor comprises a perfluorosulfonic acid polymer emulsion binder.

21. A photoelectrochemical cell in accordance with claim 16, wherein said at least one wide band gap semiconductor comprises at least one electrically conductive polymer.

22. A photoelectrochemical cell in accordance with claim 21, wherein said at least one electrically conductive polymer is selected from the group consisting of polyaniline, polypyrrole and combinations thereof.

23. A photoelectrochemical cell in accordance with claim 21, wherein said at least one electrically conductive polymer is at least partially sulfonated.

24. A photoelectrochemical cell in accordance with claim 16, wherein said at least one wide band gap semiconductor comprises one of an electron conductive polymer and a proton conductive polymer.

25. A photoelectrochemical cell in accordance with claim 15, wherein said light transmissive wall is made of a material selected from the group consisting of glass and a transparent, acrylic material.

26. A photoelectrochemical cell in accordance with claim 15 further comprising a metallic connector suitable for connecting said photoelectrochemical cell to another photoelectrochemical cell.

* * * * *